Jan. 26, 1965     C. W. STANLEY     3,166,985
MAGNETIC HOLDDOWN MEANS FOR PORTABLE TOOL
Filed May 24, 1963
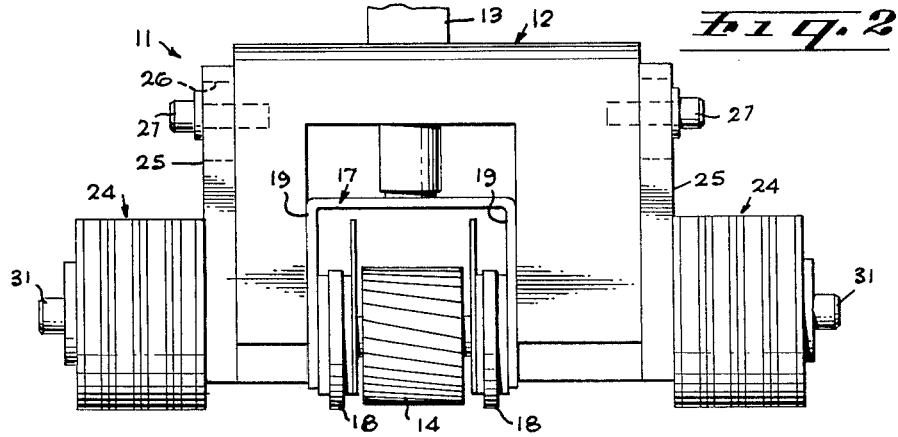
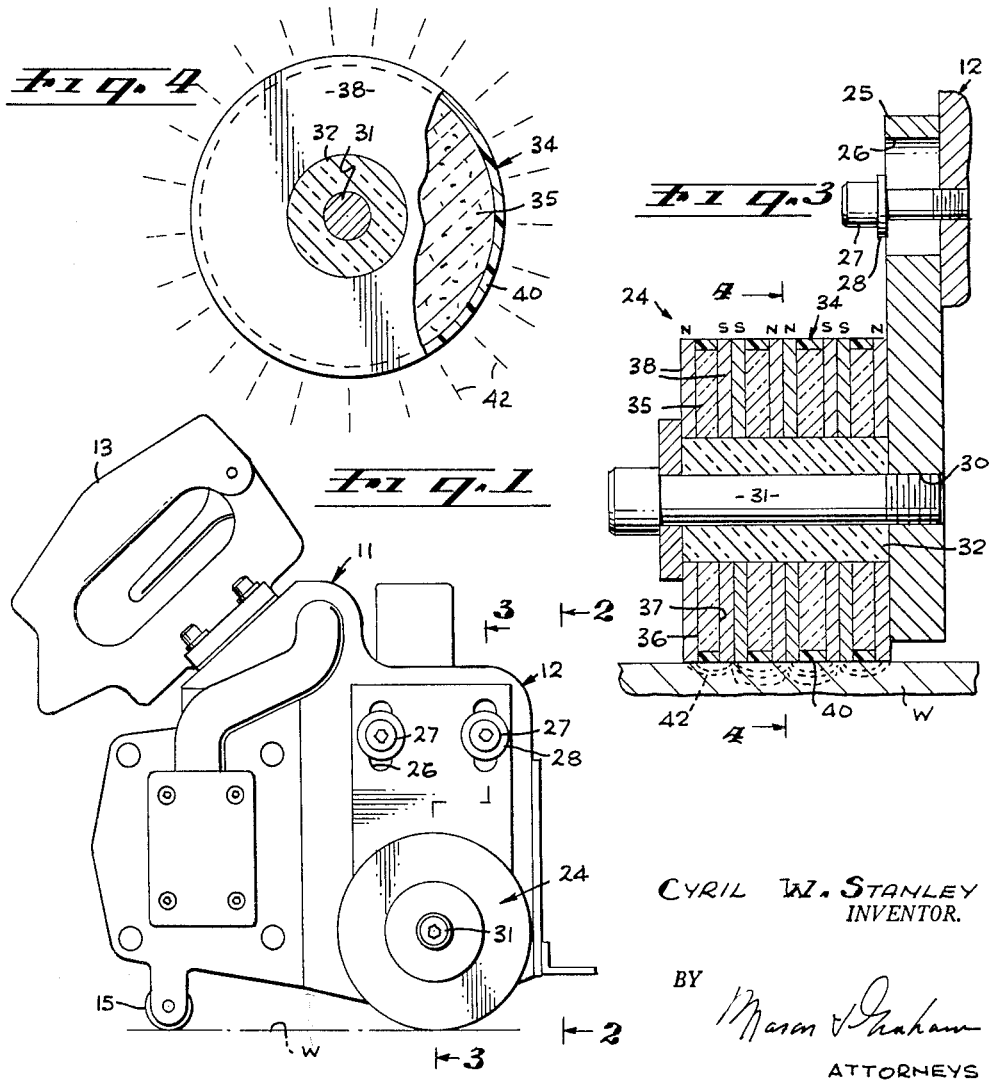
CYRIL W. STANLEY
INVENTOR.
BY
ATTORNEYS

United States Patent Office 3,166,985
Patented Jan. 26, 1965

3,166,985
MAGNETIC HOLDDOWN MEANS FOR
PORTABLE TOOL
Cyril William Stanley, Manhattan Beach, Calif., assignor to Zephyr Manufacturing Co., Inglewood, Calif., a copartnership
Filed May 24, 1963, Ser. No. 282,912
3 Claims. (Cl. 90—12)

This invention has to do generally with power-driven portable hand tools and particularly with means for holding such tools down or against the work.

The invention has particular application to hand-manipulated portable milling tools having a high speed motor-driven rotary cutter and used for machining or shaving off projections, such as welds and rivet heads, on worksheets. While such tools can be held by the operator without great difficulty for the machining of metals which are relatively soft, such as aluminum and aluminum alloys, it is very difficult for an operator to hold the tool against the work where the material is a relatively hard metal, such as steel, and the tool tends to chatter, resulting in a rough finish.

An object of the invention is to provide novel and improved means for assisting the operator in holding a portable milling tool or the like against the work where the work is a material having magnetic properties.

More particularly it is an object of the invention to provide a novel and improved magnetic holddown means adapted for attachment to or incorporation in a portable milling tool or the like. In this connection it is an object to provide a magnet means in the form of rollers comprised of a plurality of individual permanent magnets so mounted that the rollers can be moved over the surface of the work in rolling engagement therewith as the tool is advanced.

Still another object is to provide a novel and improved type of composite magnet and a novel arrangement of such magnets wherein the work forms a path for the magnetic flux.

These and other objects will be apparent from the drawing and the following description.

Referring to the drawing:

FIG. 1 is a side elevational view of a tool embodying the invention;

FIG. 2 is an elevational view of the tool of FIG. 1 in the direction of the line 2—2 thereon;

FIG. 3 is an enlarged fragmentary sectional view on line 3—3 of FIG. 1; and

FIG. 4 is a sectional view on line 4—4 of FIG. 3, partially broken away.

More particularly describing the invention, numeral 11 generally designates a portable milling tool adapted to be hand-held and manipulated, and this includes a housing 12, a handle 13, and a motor-driven rotary cutter 14. The cutter is journaled in the housing and driven at high speed by means of a motor (not shown) contained within the housing in a manner well known in the art. The motor may be either electric or air-driven. The housing is also shown provided with a rear support roller 15.

A vertically adjustable bracket 17 carries a pair of guide rollers 18 on legs 19, and the height of the rollers relative to the cutter determines the depth of cut.

At each side of the housing I provide holddown rollers designated generally by numeral 24. These rollers are mounted for rotation on an axis which is parallel to the axis of rotation of the cutter. Each roller is mounted upon a mounting plate 25 of non-magnetic metal which is adjustable vertically on the side of the housing, being provided with a pair of vertical slots 26 to receive cap screws 27 carrying washers 28. Each plate 25 is provided with a threaded opening 30 to receive a cap screw 31 which acts as an axle for the roller 24. The screw 31 is fitted with a bushing 32 of a non-magnetic metal, such as aluminum. The magnet portion of the roller comprises a series of annular magnet disks 34. Each disk includes a core 35 which is preferably what is known as a ceramic magnet, that is, a ceramic body containing dispersed therein magnetic particles which have been magnetized and in the particular cores shown the polarity of the disks is such that one side 36 thereof is the north pole while the other side 37 thereof is the south pole. The cores are sandwiched between two metal disks 38 of magnetic metal, such as steel. In order to protect the periphery of the ceramic core the metal disks are of greater diameter than the cores, and the space which would otherwise exist around the core is filled with a suitable facing of a plastics or the like designated 40.

The individual magnets 34 are disposed on the bushing 32 so that they magnetically repel each other, that is, like poles are arranged adjacent each other as indicated by the designations N and S appearing in FIG. 3. It will be apparent that when the tool is used against a workpiece W which has magnetic properties, such as a steel plate or the like, the holddown rollers 24 are in rolling contact with the workpiece, the latter being tangent to the rollers, and the workpiece thus serves as a path for the magnetic lines of force to opposite poles of the magnet disks 34 resulting in a strong magnetic attraction between the disks and the workpiece and excellent holddown power for the roller assembly as a whole without any appreciable friction against movement of the tool over the workpiece. In FIGS. 3 and 4, the magnetic lines of force to opposite poles of the magnets is indicated by the broken lines 42. These, to a great extent, are radial with respect to the individual side plates of the disks as shown on an exaggerated scale in FIG. 4.

Although I have illustrated and described a preferred form of my invention, I contemplate that various changes and modifications can be made therein without departing from the invention, the scope of which is indicated by the following claims.

I claim:

1. In a portable milling tool having a housing and a motor-driven rotary cutter, holddown means for use in retaining the tool against the face of a magnetic workpiece, comprising a plate of non-magnetic material adjustably mounted on each side of said housing beyond the cutter, a cap screw mounted in each plate and projecting outwardly thereof and normal thereto, a non-magnetic bushing on each said screw, and a set of annular magnet disks mounted on each said bushing to form a composite roller.

2. The portable milling tool set forth in claim 1 in which each magnet disk comprises a polarized core of magnetic particles embedded in a ceramic body and a metal facing disk on each side thereof possessing magnetic properties.

3. In a portable milling tool having a housing and a motor-driven cutter, holddown means for use in retaining the tool against the face of a magnetic workpiece, comprising a pair of mounting members of nonmagnetic material mounted in parallel, laterally spaced relation on said housing, an axle member mounted in and projecting laterally of each mounting member, a nonmagnetic bushing on each axle member, and a set of annular magnet disks mounted on each said bushing to form a composite roller.

References Cited by the Examiner

UNITED STATES PATENTS

| | | | |
|---|---|---|---|
| 1,115,348 | 10/14 | Taylor | 90—12 |
| 2,393,463 | 1/46 | Gottlieb | 90—12 |
| 2,414,653 | 1/47 | Lookholder | 317—159 |
| 2,625,860 | 1/53 | Plester | 90—12 |
| 2,694,164 | 11/54 | Geppelt | 317—159 |
| 2,924,871 | 2/60 | Brown. | |
| 2,954,257 | 9/60 | Besuch et al. | 317—159 X |

FOREIGN PATENTS 789,632   1/58   Great Britain.

WILLIAM W. DYER, JR., *Primary Examiner.*